United States Patent [19]

Hennig

[11] Patent Number: 4,976,193

[45] Date of Patent: Dec. 11, 1990

[54] BELLOWS WITH A MINIMIZED COMPRESSION SIZE

[76] Inventor: Kurt Hennig, Georgensteinstr. 16, 8000 München 71, Fed. Rep. of Germany

[21] Appl. No.: 340,906

[22] Filed: Apr. 20, 1989

[30] Foreign Application Priority Data

May 5, 1988 [DE] Fed. Rep. of Germany ....... 3815401

[51] Int. Cl.$^5$ ............................. F01B 19/00; F16J 3/00
[52] U.S. Cl. ........................................... 92/261; 92/44; 92/34; 74/18.2; 277/212 FB
[58] Field of Search ................... 92/34, 42, 43, 45, 47, 92/103, 261; 74/18.2; 285/227; 277/212 FB

[56] References Cited

U.S. PATENT DOCUMENTS

| | | | |
|---|---|---|---|
| 2,752,172 | 6/1956 | Ziebold | 92/34 |
| 2,913,010 | 11/1959 | Whitney, Jr. | 92/34 |
| 2,920,656 | 1/1960 | Bertolet, Jr. | 92/47 |
| 3,298,285 | 1/1967 | Webb | 92/42 |
| 3,394,631 | 7/1968 | Thompson | 74/18.2 |
| 3,530,770 | 9/1970 | McMurry | 92/42 |
| 4,457,213 | 7/1984 | Morgan | 92/45 |
| 4,579,045 | 4/1987 | Tominaga | 92/45 |
| 4,638,722 | 1/1988 | Schneider | 92/34 |
| 4,745,848 | 5/1988 | Hennig | 92/34 |

FOREIGN PATENT DOCUMENTS

| | | | |
|---|---|---|---|
| 1378901 | 10/1964 | France | 277/212 FB |
| 0032453 | 3/1977 | Japan | 92/34 |
| 398196 | 2/1966 | Switzerland | 92/34 |

Primary Examiner—Edward K. Look
Assistant Examiner—Thomas Denion
Attorney, Agent, or Firm—Thomas & Kerr

[57] ABSTRACT

The invention relates to a bellows with supporting elements, the supporting elements being provided with a notch in the zone where the folded material of the accordion overlaps. Such a bellows is characterized by an especially small compression size.

13 Claims, 2 Drawing Sheets

BELLOWS WITH A MINIMIZED COMPRESSION SIZE

BACKGROUND OF THE INVENTION

Bellows, serving especially for, the protection of parts of machine tools, are provided with supporting frames for stiffening and achieving a good inherent stability which are inserted from the inside into the outside facing pleats. The form of these supporting frames matches the profile of the track against which the supporting frames rest during operation. Bellows, with a bottom-side open accordion which consists of a cover and two lateral walls, have generally U-shaped supporting frames. In the corner areas of the bellows —due to the folding of the accordion- several layers of material of the accordion lie superimposed. Additionally, there is the material thickness of the supporting frames. The compression size of the bellows, this means the minimum axial length to which the bellows are compressible, is, therefore, limited, because of the numbers of the layers of material in the corner areas of the bellows.

SUMMARY OF THE INVENTION

The object of the invention is, therefore, to provide a bellows in such a way, that the compression size of the bellows will be significantly minimized.

Brief Description of the Drawings

Some embodiments of the invention are illustrated in the drawings. In the drawings.

Detailed Description

Figure 1:
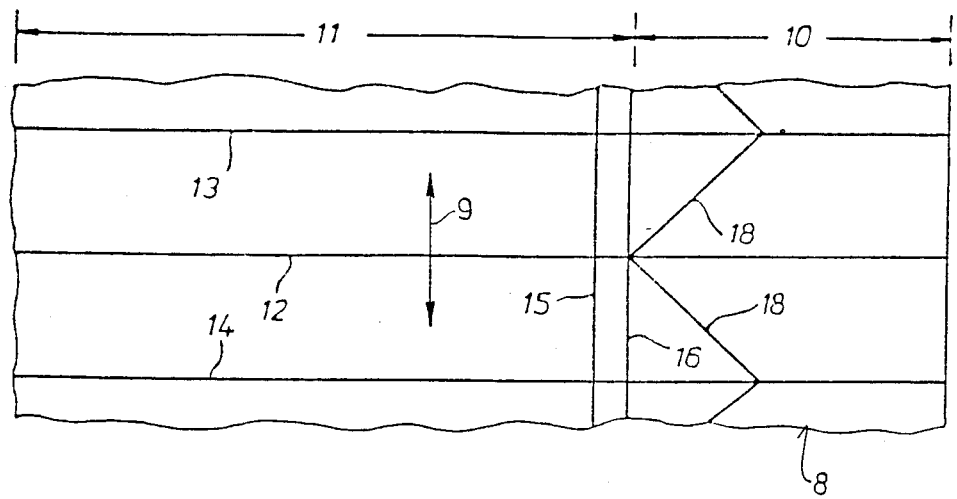
FIG. 1 shows a partial representation of the accordion material before folding.
Figure 2:
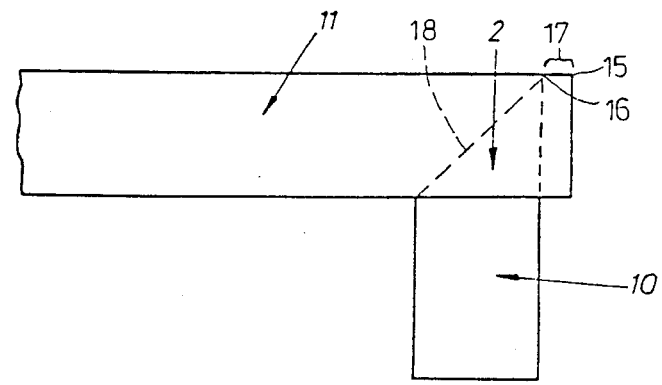
FIG. 2 shows a front view of the bellows produced of the accordion material according to FIG. 1, without supporting elements.

First, with the aid of FIG. 1 and 2 an exemplified embodiment of an accordion is explained, as it will be used for the bellows according to the invention.

FIG. 1 shows a partial representation of the flat, spread out accordion material in the area of a wall 10 and a part of the cover 11. The line 12 marks the position of an inside facing pleat of the bellows and the lines 13 and 14 mark the position of the adjacent, outside facing pleats.

The fold lines 15 and 16 in the pivoted position of the wall, FIG. 2, result in a certain lateral overhang 17 of the cover 11 over the wall 10. Fold lines 18 enable the pivoting of the wall 10 with respect to the cover 11.

The accordion 8 of the bellows is extensible in an axial direction 9 and has alternating inside and outside facing pleats which are transverse to the extension direction, in the direction of the lines 12, 13 and 14. The bellows are provided with supporting elements in the area of at least some outside facing pleats.

Figure 3:
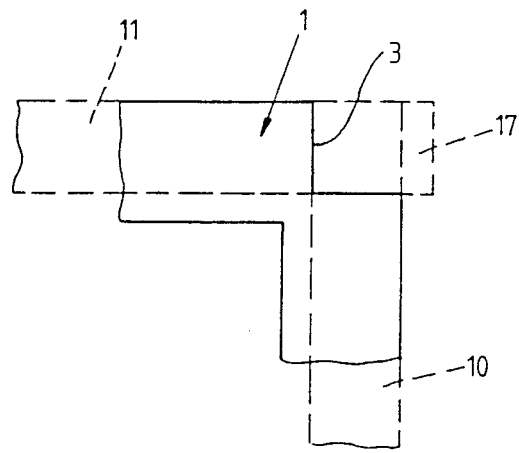
FIG. 3 shows a view of the supporting elements, provided for the bellows according to FIG. 2.

FIG. 3 shows such a supporting element with solid lines. The accordion of the bellows in FIG. 3 are only indicated with dashed lines.

The supporting element 1 of the embodiment in FIG. 3 is a U-shaped frame, provided with a notch 3 which is located in a corner area of the bellows defined by the cover 11 and the adjacent walls 10, that is, the zone in which the folded material of the accordion overlaps (this is the triangular zone with the reference number 2 in FIG. 2). The notch 3 is rectangular in the embodiment according to FIG. 3.

With this notch 3 it will be achieved, that no enlarged material thickness (compared to the rest of the areas of the bellows) results in the corner areas of the accordion, despite the here unavoidable overlapping of the material of the cover 11 and the adjacent wall 10. In this way the compression size of the bellows (this means minimum axial length to which the bellows are compressible) will not be increased at the corner areas of the bellows.

The supporting element 1, as illustrated in FIG. 3, protrudes below the pleats of cover 11, and protrudes inside the pleats of the wall 10, and also forms a glide element which helps the bellows to be guided on a guide track of a part of a machine tool which has to be covered.

The bellows consist suitably of at least one outer cover layer 24 and one inner stiffening layer 26 which is provided advantageously with a perforation running along the fold lines. These two layers will be firmly connected with each other at least in the corner areas of the edges of the outside facing pleats, but preferably in the area of the whole edges of the outside facing pleats.

This connection of the layers of the bellows at the fold edges can be achieved by welding or with the help of a U-shaped clamp.

Figure 4:
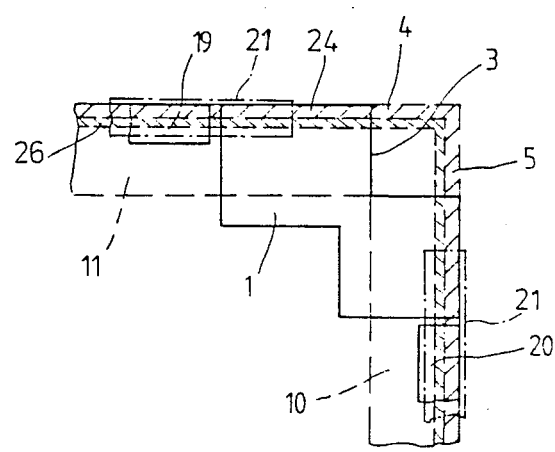
FIG. 4 shows a supporting element according to FIG. 3, to be inserted in a slightly modified bellows.

Within the scope of the invention it is also possible to provide the supporting elements 1 only in the corner areas of the bellows as corner pieces with a notch 3, illustrated in FIG. 4. Adjacent to these supporting elements in the pleats of the cover 11 and the wall 10 is a reinforcement 19 which extends to the whole width of the cover 11, and a reinforcement 20 which extends the whole height of the arm 10.

In FIG. 4 the connection of the layers of the accordion in the area of the edges of the outside facing pleats is shown by the reference numbers 4 and 5. The supporting element 1 and the reinforcements 19 and 20 will be fixed in the pleats with this connection at the same time.

While the bellows illustrated in the FIGS. 1 to 3 have an overhang 17 of the cover 11 over the slightly recessed walls 10, it is assumed in the embodiment according to FIG. 4, that the cover 11 stops flush with the walls 10.

Figure 5:
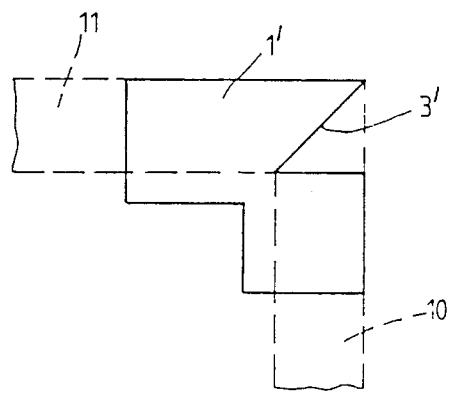
FIG. 5 shows a further embodiment of a supporting element.

FIG. 5 shows an alternative embodiment where the supporting element 1' is provided with a triangular notch 3' which matches exactly with the zone 2, where the material of cover 11 and wall 10 overlap in the corner area.

The FIGS. 1 to 5 show embodiments of bellows whose accordions are open at the bottom side and, therefore, comprise a cover and two lateral walls. The invention, however, also applies to a closed accordion with a polygonal section. The supporting elements, herewith, will be arranged in at least some, but preferably in all, corner areas of the polygonal section.

The connection with clamps 21 or by welding at the edges of the outside facing pleats (reference numerals 4 and 5 according to FIG. 4) result in an opposed, inwardly directed tension, when the bellows is extended.

This improves the stability and the self supporting effect of the bellows. In this way it is possible to provide the supporting elements in only some pleats.

In the scope of the invention it is also possible to provide the welds or clamps 21 in the areas of the edges of the inside facing pleats, if the opposed inwardly directed tension of the pleats is to be increased further during the extension.

When the layers of the accordion at the edges of the pleats, as well as the supporting elements 1 arranged in the outside facing pleats and as well as the possible additional arranged reinforcements 19 and 20, are to be connected with each other with a U-shaped clamp, the clamp can be effectively anchored in the accordion material by squeezing together. If pleats are larger it is also possible to provide such clamps for the edges of the inside facing pleats. These clamps can extend over either a partial area of the pleat length (for example over the connection zone between the supporting element 1 and the two adjacent reinforcements 19 and 20 according to FIG. 4) or the whole pleat length.

It will be understood that the foregoing description is of a preferred embodiment of the invention and that other and different embodiments are within the spirit and scope of the concept of the invention as set forth in more detail in the following claims.

I claim:

1. A bellows, including an accordion extensible in an axial direction comprises a cover and at least one side wall intersecting said cover, with said cover and side wall each including alternating inside and outside facing pleats which run transverse to the axial direction, with the pleats of the cover and side wall overlapping at their intersection and forming a zone of increased thickness in the pleats, supporting elements provided in at least some of said pleats, characterized in that the supporting elements (1, 1') define notches (3, 3') at least for receiving the overlapping pleats in the zone (2) of the corner area of the bellows, where the folded material of the pleats overlap.

2. The bellows as claimed in claim 1, characterized in that the supporting elements (1,1') are formed as corner pieces and are positioned only at the intersection of the cover and side wall.

3. The bellows as claimed in claim 1, characterized in that the supporting elements (1,1') also are formed as guide elements.

4. The bellows as claimed in claim 1, wherein the accordion is a bottom-side open accordion comprising a cover (11) and two lateral walls (10), characterized in that the supporting elements (1,1') are provided for corner areas formed by the cover and the two adjacent walls.

5. The bellows as claimed in claim 4, characterized in that the notches of said supporting elements (1) are L-shaped.

6. The bellows as claimed in claim 4, characterized in that the notches (3') of said supporting elements (1) are V-shaped.

7. The bellows as claimed in claim 1, comprising a closed accordion with a polygonal section, characterized in that the supporting elements are provided at least for some corner areas of the polygonal section.

8. The bellows as claimed in claim 1, characterized in that the accordion comprises at least one outer cover layer (24) and an inner stiffening layer (26) provided with a perforation at the pleat lines, said outer cover layer (24) and said inner stiffening layer (26) being firmly connected with each other at least in the corner areas of the edges of the outside facing pleats of the accordion.

9. The bellows as claimed in claim 8, characterized in that said outer layer (24) and said inner stiffening layer (26) of the accordion are connected at the pleat edges by welding.

10. The bellows as claimed in claim 8, characterized in that said outer cover layer (24) and said inner stiffening layer (26) of the accordion are connected with each other at the pleat edges by a U-shaped clamp (21).

11. The bellows as claimed in claim 1, characterized in that additional reinforcements (19, 20) are provided in at least some of the outside facing pleats adjacent the supporting elements (1, 1').

12. A bellows including an accordion (8) extensible in an axial direction (9), said accordion comprising a cover (11) and a lateral wall (10) adjoining said cover in a corner zone (2), said cover and said lateral wall each comprising alternating inside and outside facing pleats (12, 13 14) which run transverse to said axial direction, and support elements (1, 1') adjacent the corner zone of at least some of said outside facing pleats, said support elements each including a notched portion (3) straddling said corner zone, whereby as the accordion is contracted the pleats of the wall and cover overlap each other in the corner zone and form additional thicknesses of pleats and the notched portions of the support elements adjacent he corner zones receive the additional thicknesses of pleats and allow the accordion to be contracted to a small compression size.

13. A bellows as claimed in claim 12 wherein said notched portions each define an L-shaped notch.

* * * * *